Figure 1:
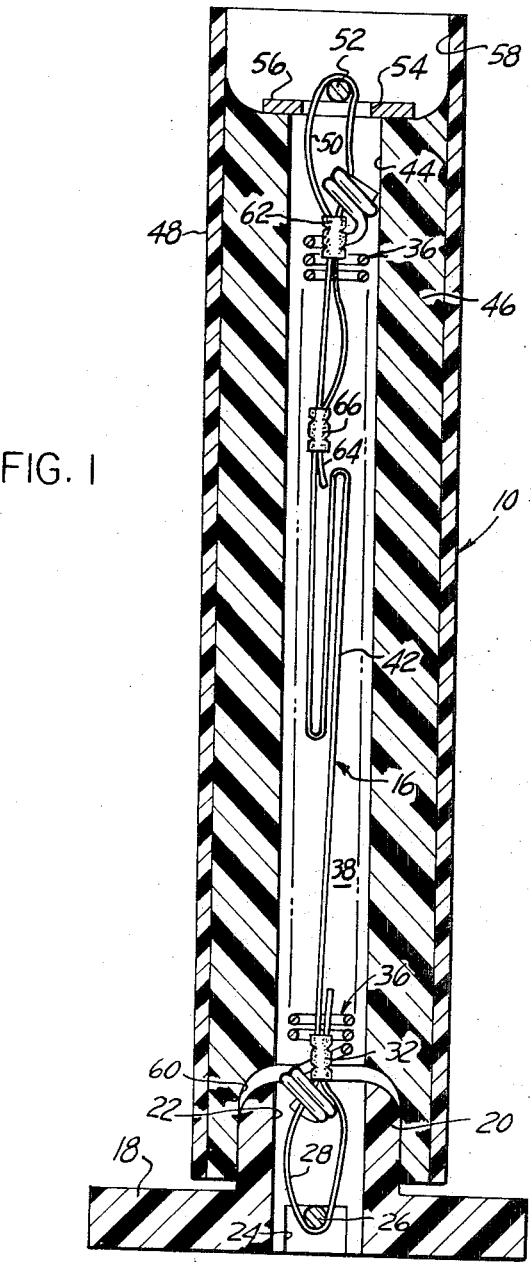

United States Patent
Medley, Jr.

[11] 3,838,661
[45] Oct. 1, 1974

[54] POST

[76] Inventor: Robert Lee Medley, Jr., 18930 Eldorado Pl., Lathrup Village, Mich. 48076

[22] Filed: July 10, 1972

[21] Appl. No.: 270,101

[52] U.S. Cl.............................. 116/63 P, 40/125 N
[51] Int. Cl............................................... E01f 9/10
[58] Field of Search ................... 116/63, 63 P, 114; 40/125 J, 125 H, 145 A; 94/1.5

[56] References Cited
UNITED STATES PATENTS

| | | | |
|---|---|---|---|
| 1,284,376 | 11/1918 | Lehman | 40/145 A |
| 1,679,623 | 8/1928 | Olsen | 40/145 A |
| 1,939,968 | 12/1933 | Frei, Jr. | 40/145 A |
| 2,165,704 | 7/1939 | Hood | 40/145 A |
| 3,371,647 | 3/1968 | Shopbell | 116/114 |
| 3,485,201 | 12/1969 | Kelley | 116/63 P |

*Primary Examiner*—Louis J. Capozi

[57] ABSTRACT

A synthetic plastic base adapted to be secured to a pavement has an upstanding tubular projection with a rounded top and a cable anchorage member at the bottom thereof. Telescoped upon the projection but separable therefrom is a correspondingly-shaped socket in the bottom of an elongated tubular upright plastic post. Inside the tubular casing of the post is a tubular plastic lining with a hollow central passageway containing an elongated steel tension spring, the lower end of which is anchored to the cable anchorage member in the projection on the base and the upper end of which is secured to a loop in the upper end of a flexible steel cable anchored to a plate in a recess in the upper end of the post. The cable has a length greater than the length of the spring in its relaxed condition but becomes taut when the spring extends so as to approach its elastic limit. The lower end of the cable is anchored to a pair of anchoring pins in the center of the base. When the post is knocked over by an impact, it becomes detached from the base and propelled away from the base. Thereupon the tension spring elongates and absorbs the shock but is prevented from elongating beyond its elastic limit by the cable becoming taut. The post is easily returned to its initial upright position upon the base.

5 Claims, 2 Drawing Figures

PATENTED OCT 1 1974 3,838,661

POST

SUMMARY OF THE INVENTION

The elongated tubular upright member having in its lower end a socket fitting over a projection in the base in separable mating engagement where it normally holds these parts together without the active tension force of the spring, so that if the spring tension becomes relaxed in the course of time, these parts will remain frictionally but detachably held together. The elongated hollow helical tension spring in the spring chamber containing the elongated extensible connector cable having a flexible intermediate portion with a length greater than the length of the spring in its relaxed condition but less than the length of the spring in its extended condition at its elastic limit serves as a safety feature which prevents the spring from being drawn outward beyond its elastic limit, upon being subjected to collission with a vehicle, so that it halts the expansion of the spring when the intermediate portion of the cable becomes taut. The hollow helical tension spring also provides space for accommodating the coiled or looped flexible intermediate portion of the elongated extensible member or cable.

Figure 2:
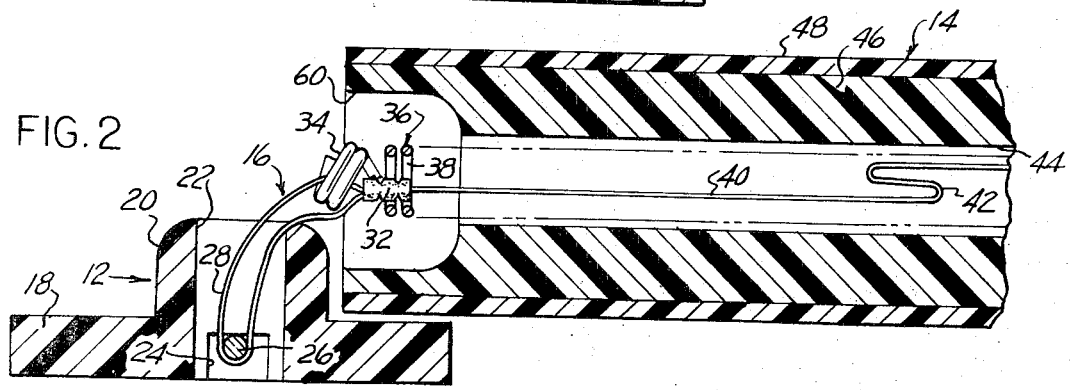

In the drawing,

FIG. 1 is a longitudinal vertical section through the collapsible post in its upright operating condition, according to one form of the invention; and FIG. 2 is a fragmentary longitudinal section through the lower end of the post of FIG. 1 in its collapsed position after collision with a vehicle.

Referring to the drawing in detail, FIGS. 1 and 2 show a collapsible post, generally designated 10, according to one form of the invention, as consisting generally of a base unit 12 and a separable spring-containing post unit 14 connected to one another by an elongated extensible connecting member 16, such as a flexible cable. The base unit 12 includes a base body 18 preferably molded from synthetic plastic material and having an integral upstanding tubular projection 20 rising from the center thereof and containing a central bore 22. Formed in the base body 18 at the lower end of the bore 22 is a recess or slot 24.

Seated in the recess or slot 24 and extending across the bore 22 is a lower spring anchorage member or pin 26. Looped around or otherwise secured to the lower spring anchorage member 26 is the lower loop portion 28 of the elongated extensible connector member 16. The lower loop portion 28 is attached by a lower cable clamp 32 to the lower end 34 of an elongated hollow helical tension spring 36. The spring 36 contains a central chamber 38 through which passes the flexible intermediate portion 40 of the extensible connector member 16. The flexible intermediate portion is longer than the spring 36 in its relaxed condition and is coiled or looped at 42 within the chamber 38. The length of the flexible intermediate portion 40, however, is less than the length of the spring 36 in its extended condition at its elastic limit, so as to prevent further extension therebeyond.

The helical tension spring 36 is housed in an elongated passageway 44 within a tubular filler core 46 of synthetic plastic material such as polyurethane. The filler core 46 is secured within an elongated tubular upright member 48, also preferably of synthetic plastic material, both of which protect the spring 36 from damage.

The elongated extensible member or cable 16 terminates in an upper loop portion 50 which passes around an upper anchorage member or pin 52 which in turn passes across a central opening 54 in an upper anchorage plate 56 spanning the elongated passageway 44 at the upper end thereof within an annular recess or hollow 58 formed jointly by the upper end of the tubular upright member 48 and the core 46. The lower end of the upright tubular member 48 has a lower recess or socket 60 which is configured to fit over the projection 20 in the base 12 in mating engagement therewith so as to hold the collapsible post 10 in its vertical operating position shown in FIG. 1. The upper end of the spring 36 is secured by an upper cable clamp 62 to the upper loop portion 50 of the extensible connector member 16 while the free upper end 64 of the upper loop portion 50 of the extensible connector member 16 is secured to the intermediate portion 40 thereof by an intermediate cable clamp 66.

In the assembly of the collapsible post 10, the lower end of the cable 16 is bent reversely back upon itself to form the lower loop portion 28, which is then fastened by the lower cable clamp 32 to the lower end 34 of the elongated helical tension spring 36. The remainder of the cable 16 is then passed through the central chamber 38 of the tension spring 36 to form the intermediate portion 40 thereof. The upper end of the cable 16 is brought out through the upper end of the spring 16 and looped around the upper anchorage pin 52 and threaded back on itself through the upper end of the spring 36 and thence downward along the intermediate cable portion 40 and secured thereto by the intermediate cable clamp 66. The upper loop portion 50, which is longer than the lower loop portion 28, is then secured by the upper cable clamp 62 to the upper end of the spring 36. The remainder of the intermediate cable portion 40, which is longer than the spring 36 in its relaxed condition, is disposed loosely within the central spring chamber 38, as indicated in FIG. 1.

The lower end of the spring 36, which is shorter than the length of the passageway 44 within the tubular pillar core 46, is now pulled downward so as to place it under tension, whereupon the smaller lower loop portion 28 is pulled downward through the bore 22 in the base unit 12 to the lower portion thereof, where it is secured by the lower spring anchorage pin 26. The latter is then placed with its opposite ends seated in the recess or slot 24 in the body 18 of the base unit 12, completing the assembly. Thus the spring-equipped post unit 14 is held in mating engagement with the outstanding projection 20 of the base unit 12 by the interfitting engagement of these mating or telescoping parts, and also by the tension of the slightly extended tension spring 36.

In the operation of the invention, let it be assumed that the base unit 12 of the assembled collapsible post 10 has been seated in the pavement in a suitable location on a street or highway, such as a crossing intersection, and let it further be assumed that a vehicle collides with the collapsible post 10 and hits the separable spring-containing post unit 14 with sufficient force to knock it off the base unit 12 and to separage the mating or telescoping connection of the base projection 20 with the lower socket 60. Let it likewise be assumed that the force of this collision is sufficient also to knock the spring-containing post unit 14 sufficiently far from the base unit 12 to stretch the spring 36 to its elastic limit, whereupon the slack 42 in the intermediate cable portion 40 is taken up so that it becomes taut. This action immediately prevents further extension of the spring 36 beyond its elastic limit and thus prevents the spring from being damaged. It also brings the travel of the separable spring-containing post unit to a halt, whereupon the tension of the now-extended tension spring 36 retracts the spring-containing post unit 14 back to the base unit 12. The post unit 14 can then again be superimposed upon the base unit 12 in telescoping relationship therewith and its traffic regulating function resumed without serious damage either to the colliding vehicle or to the collapsible post 10.

I hereby: make the following claims:

1. A collapsible post comprising
a base adapted to be seated in a pavement or the like and having thereon an upstanding projection,
an elongated tubular upright member having in the lower end thereof a socket fitting over said projection in detachable mating engagement therewith and having an elongated spring chamber extending upward from said socket to the upper portion of said upright member,
a lower anchorage member secured to said base adjacent said projection,
an upper anchorage member secured to said upper portion of said upright member,
an elongated hollow helical tension spring disposed in said spring chamber,
means connecting the upper end portion of said spring to said upper anchorage member,
and elongated extensible connector means having a lower portion connecting said lower anchorage member to the lower end portion of said spring and having a flexible intermediate portion with a length greater than the length of said spring in its relaxed condition but less than the length of said spring in its extended condition at its elastic limit,
said intermediate portion being loosely disposed inside said spring and connecting the lower end portion of said spring to the upper end portion thereof.

2. A collapsible post, according to claim 1, wherein said elongated extensible connector means also has an upper portion, and wherein said means connecting said upper end portion of said spring to said upper spring anchorage member comprises said upper portion of said elongated extensible connector means.

3. A collapsible post, according to claim 1, wherein said lower portion of said elongated extensible connector means comprises a flexible cable.

4. A collapsible post, according to claim 3, wherein said intermediate portion of said elongated extensible connector means also comprises a flexible cable.

5. A collapsible post, according to claim 4, wherein said means connecting said upper end portion of said spring to said upper anchorage member also comprises a flexible cable looped around said upper anchorage member.

* * * * *